Sept. 16, 1969　　　　　　　J. HARMAN　　　　　　　3,466,740
MACHINE TOOLS PROVIDED WITH AUTOMATIC TOOL-CHANGE FACILITIES
Filed Nov. 9, 1967　　　　　　　　　　　　　　　　11 Sheets-Sheet 1

INVENTOR
Julius Harman
BY Babcock, Deming, Seebold
ATTORNEYS

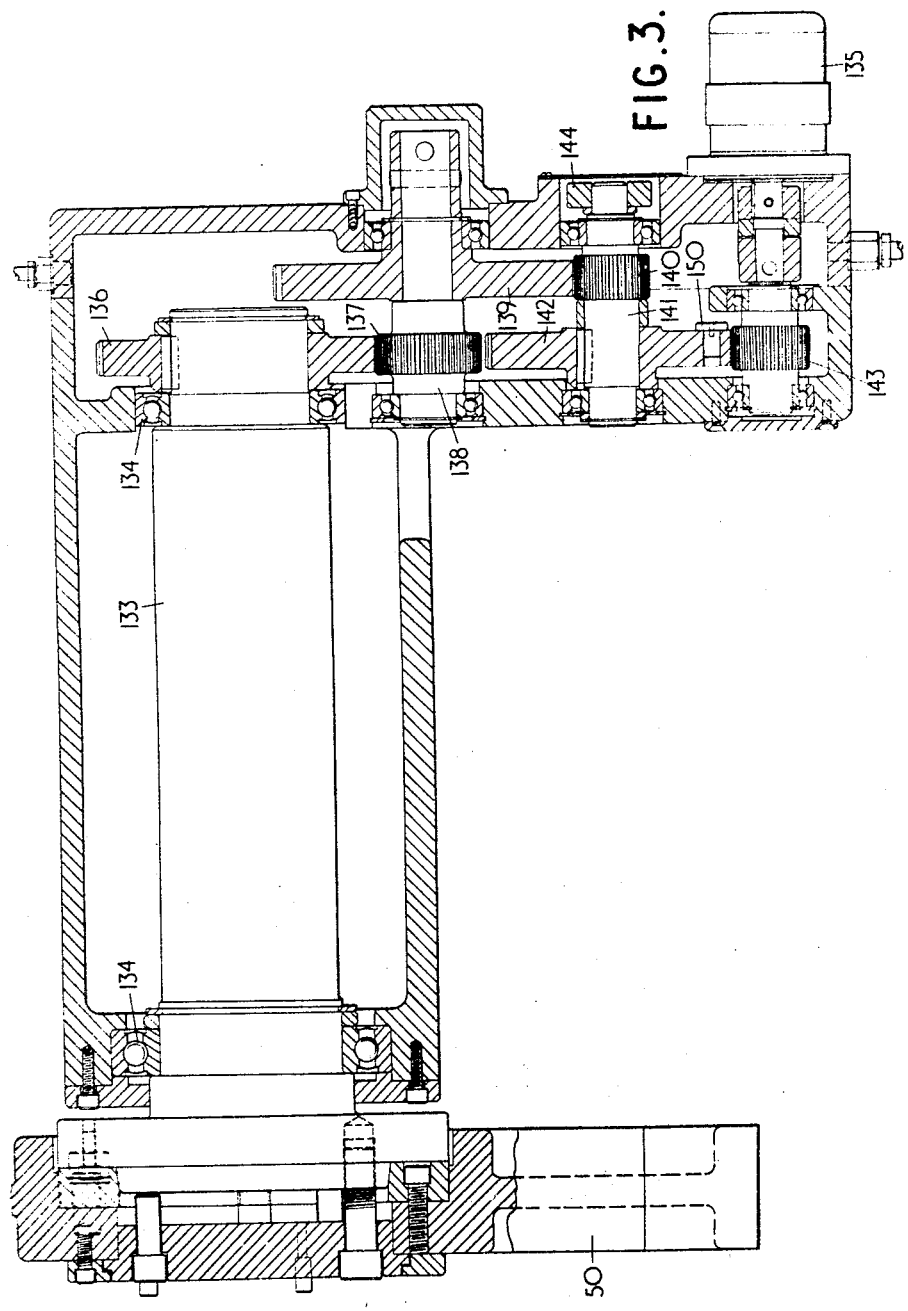

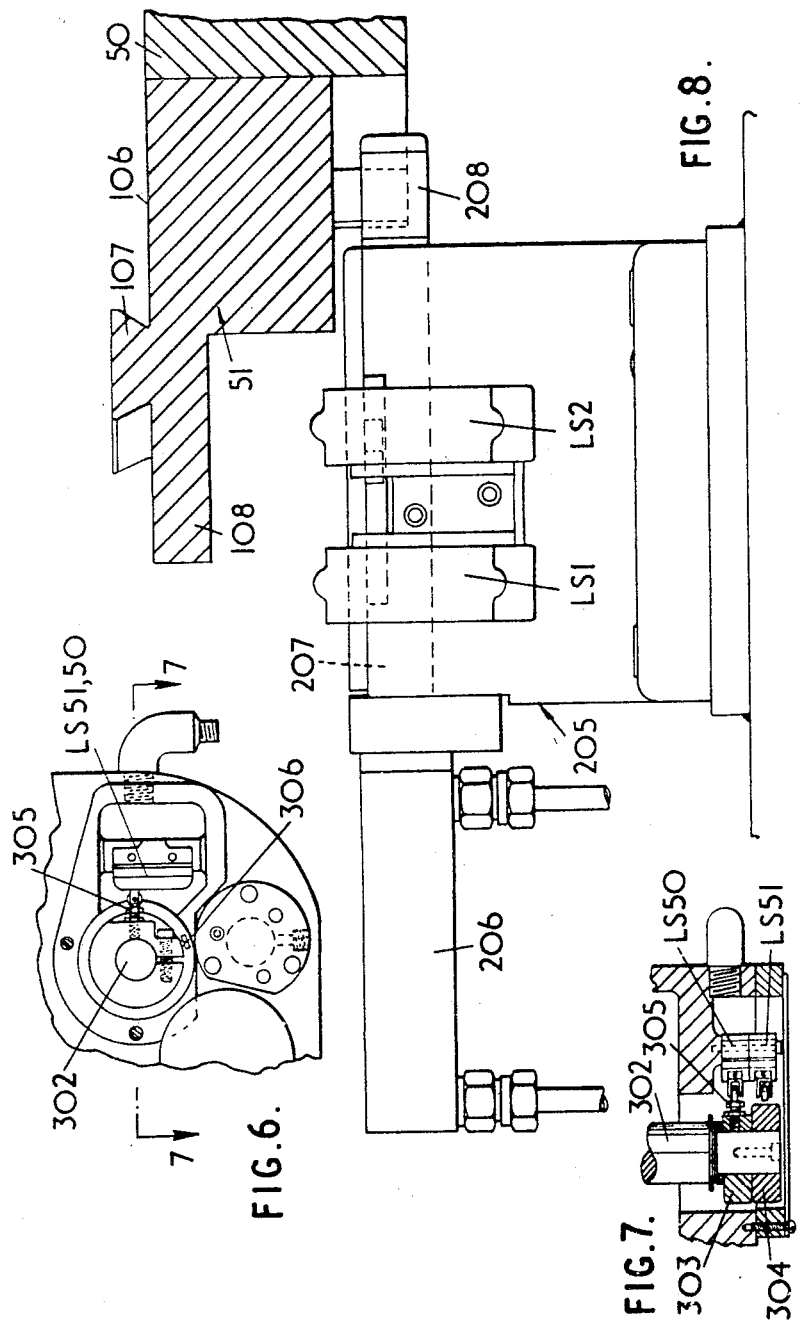

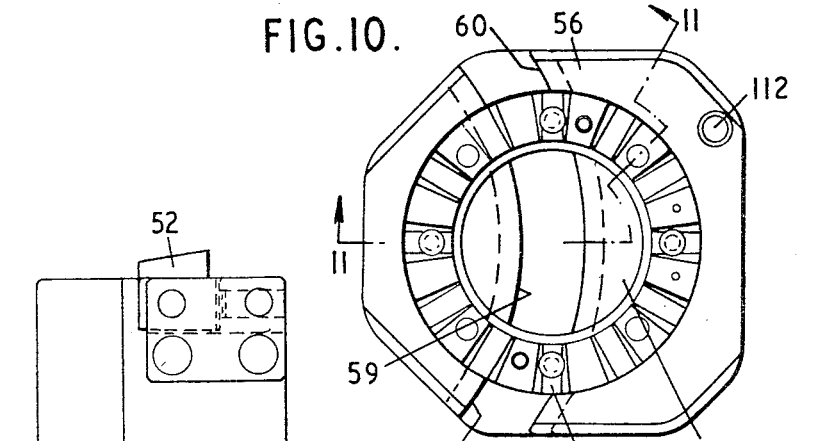
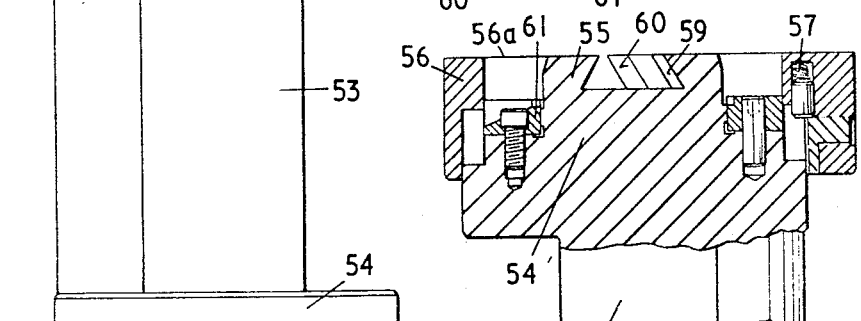
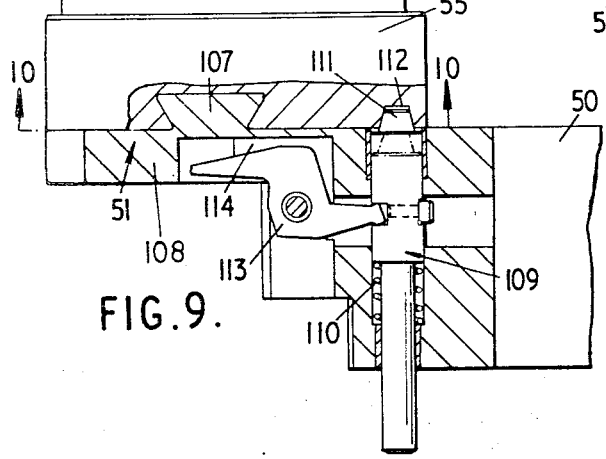

Sept. 16, 1969  J. HARMAN  3,466,740
MACHINE TOOLS PROVIDED WITH AUTOMATIC TOOL-CHANGE FACILITIES
Filed Nov. 9, 1967  11 Sheets-Sheet 6

United States Patent Office 3,466,740
Patented Sept. 16, 1969

3,466,740
MACHINE TOOLS PROVIDED WITH AUTOMATIC
TOOL-CHANGE FACILITIES
Julius Harman, Baginton, England, assignor to Alfred
Herbert Limited, Coventry, England, a British company
Filed Nov. 9, 1967, Ser. No. 681,641
Claims priority, application Great Britain, Nov. 11, 1966,
50,650
Int. Cl. B23q 17/00
U.S. Cl. 29—568
6 Claims

ABSTRACT OF THE DISCLOSURE

A machine tool with a magazine for tools and a power operated transfer device for transferring selected tools from the magazine to a tool mount, is also provided with a second magazine for additional tools and an additional tool transfer device for exchanging tools between the two magazines.

---

This invention relates to machine tools provided with automatic tool-change facilities. It is an object of the invention to provide such a machine tool in a convenient form.

A machine tool in accordance with the invention includes at least one tool mounting means, a tool transfer device for exchanging a tool carried by said tool mounting means with a tool selected from a plurality of tools carried by a first indexable storage magazine, a second indexable tool storage magazine for holding a plurality of additional tools, and means for exchanging a selected tool in the first tool storage magazine for a selected tool in the second tool storage magazine.

Figure 1:
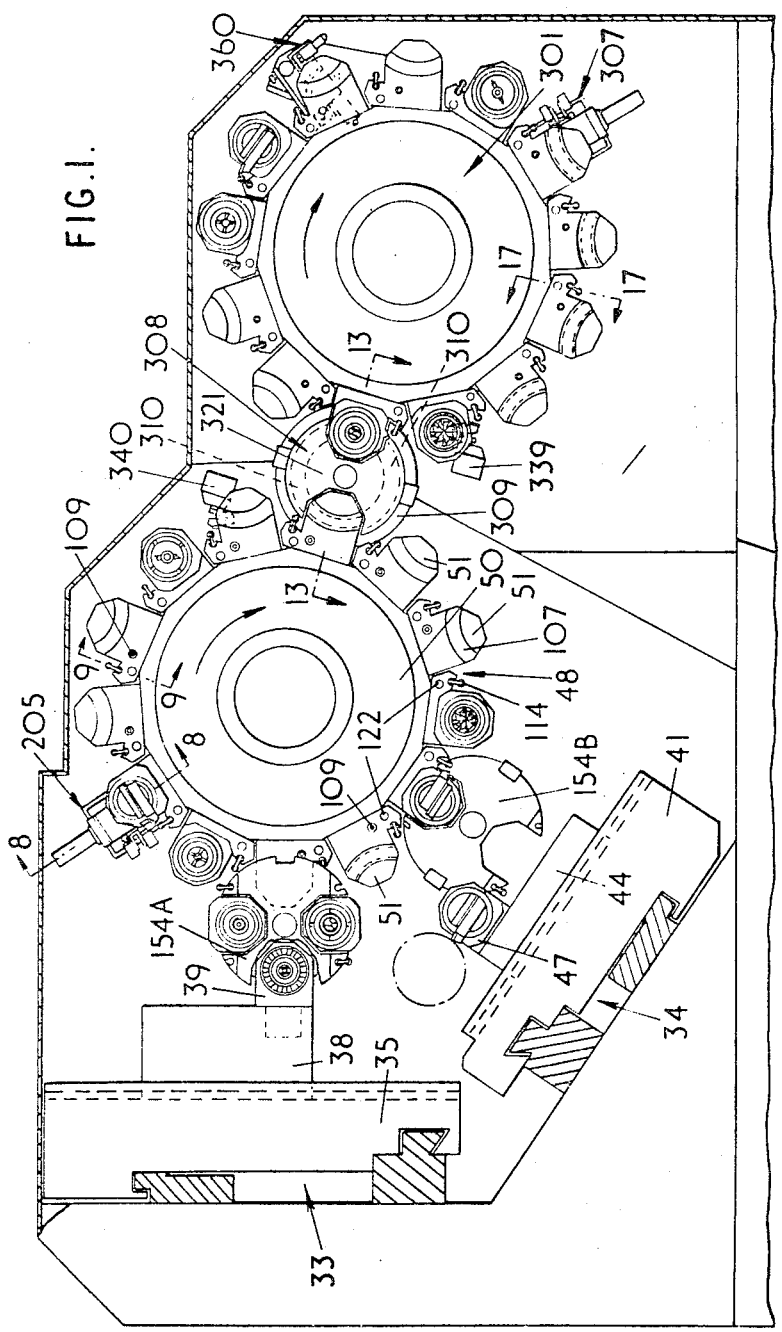
Figure 2:
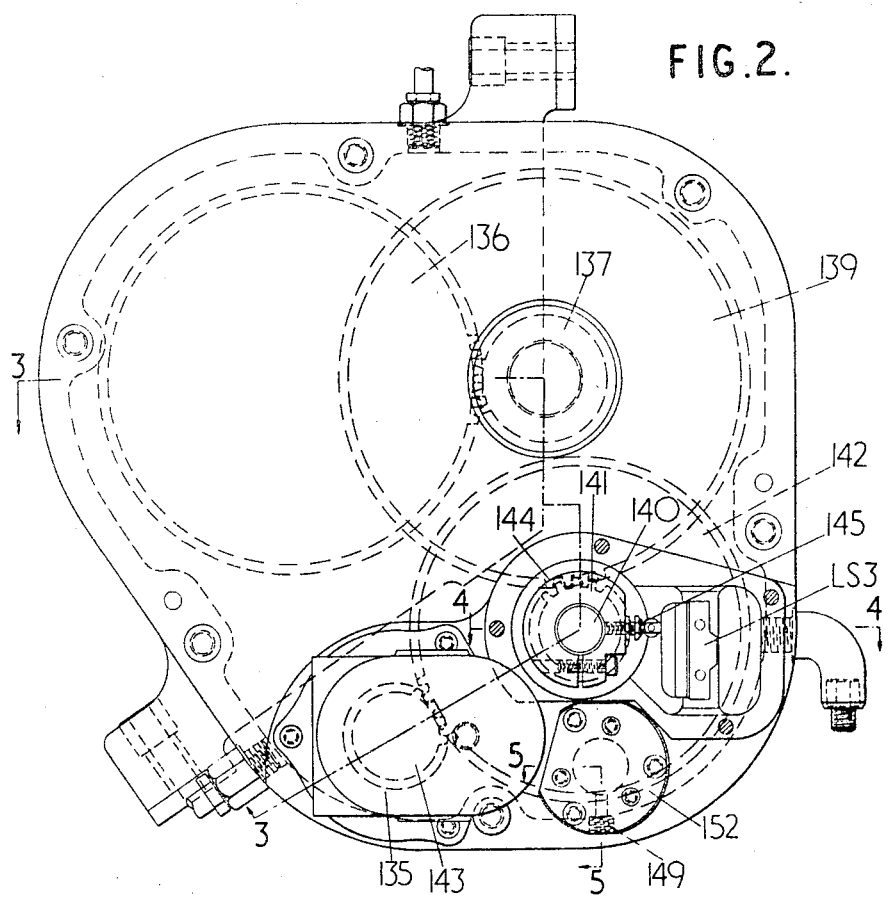
Figure 4:
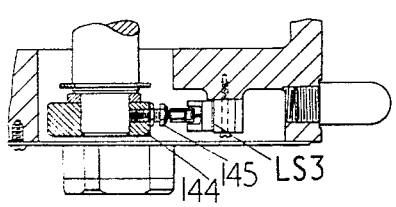
Figure 5:
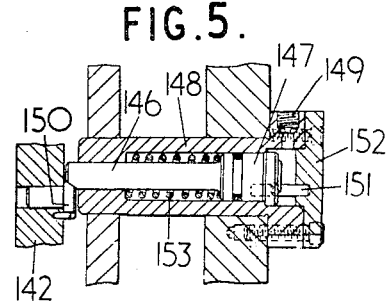
Figure 12:
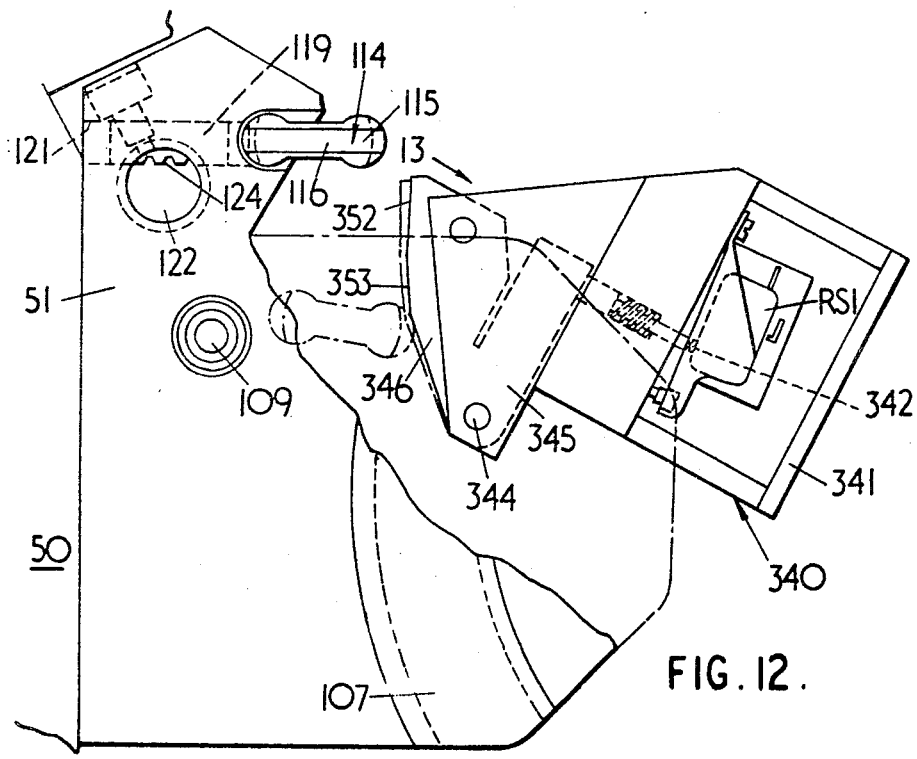
Figure 13:
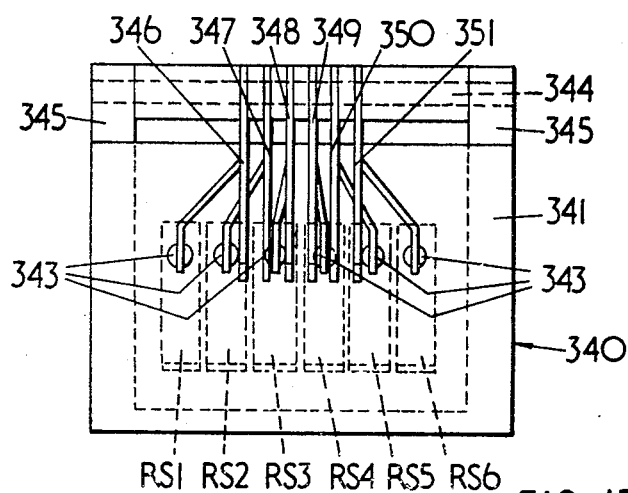
Figure 14:
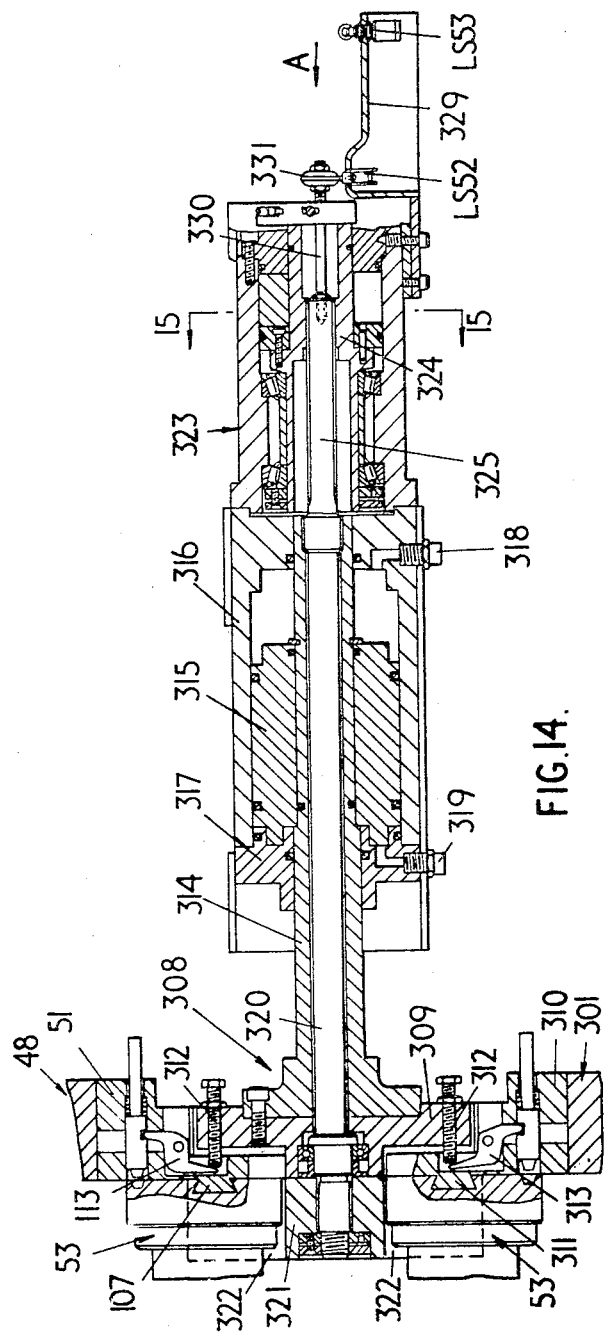
Figure 15:
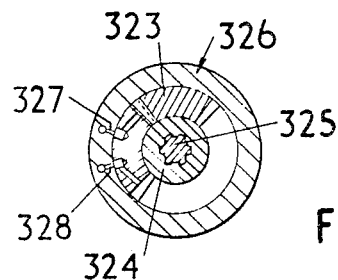
Figure 16:
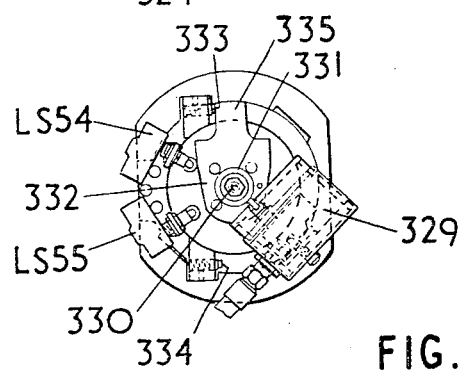
Figure 17:
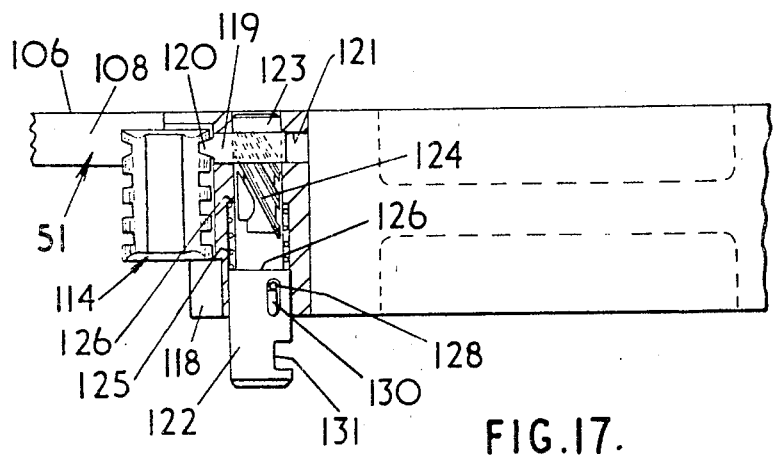
Figure 18:
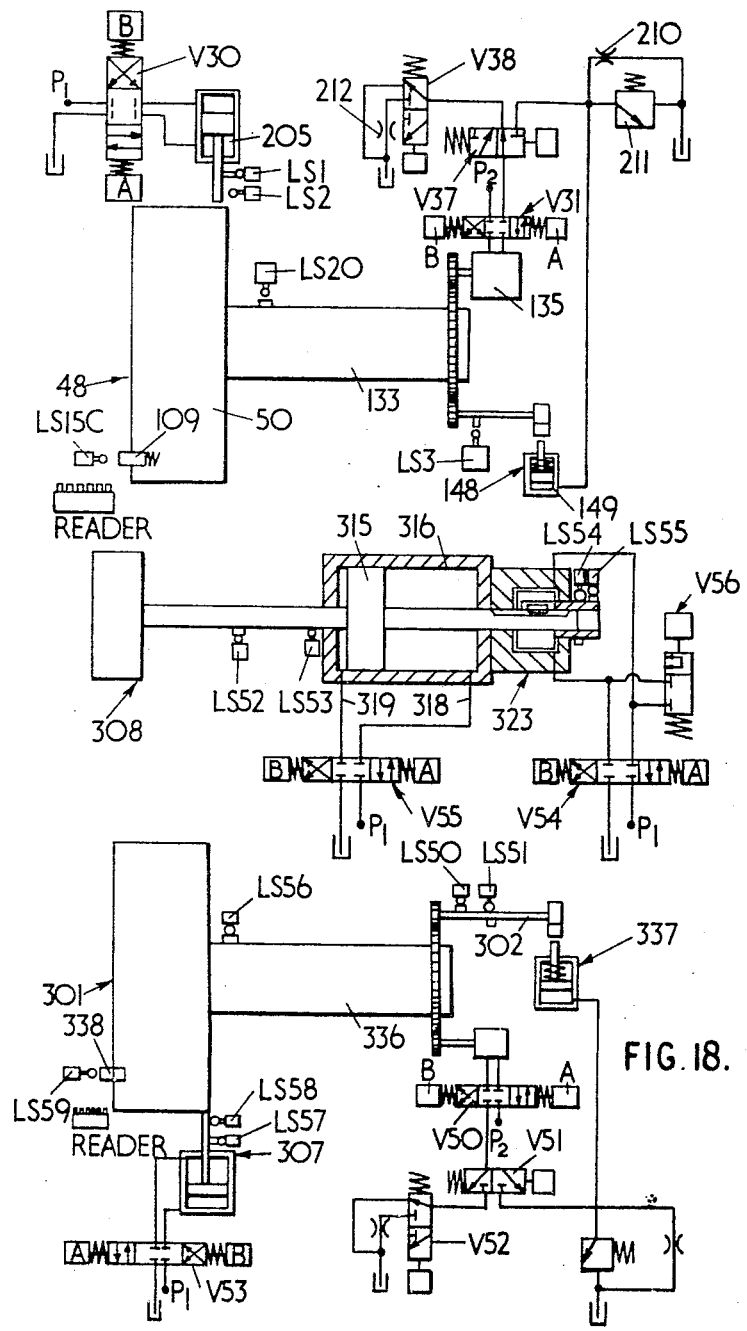
Figure 19:
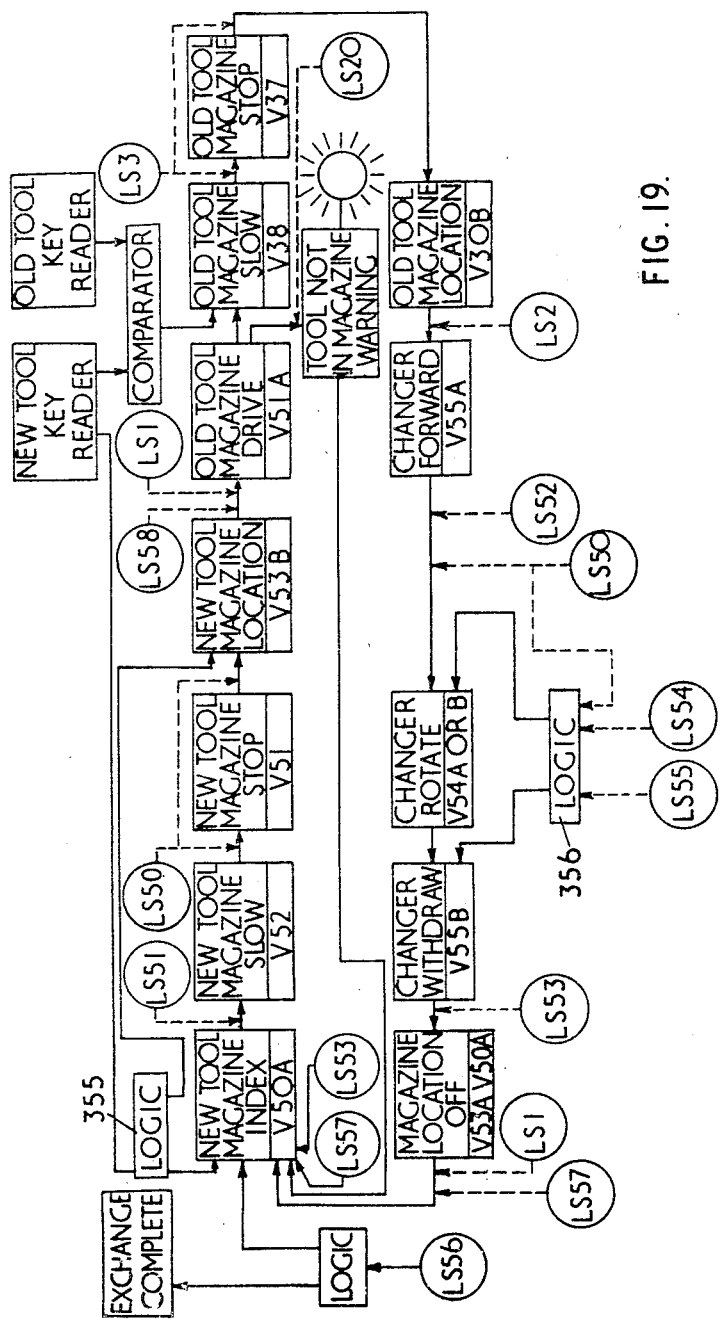
Figure 20:
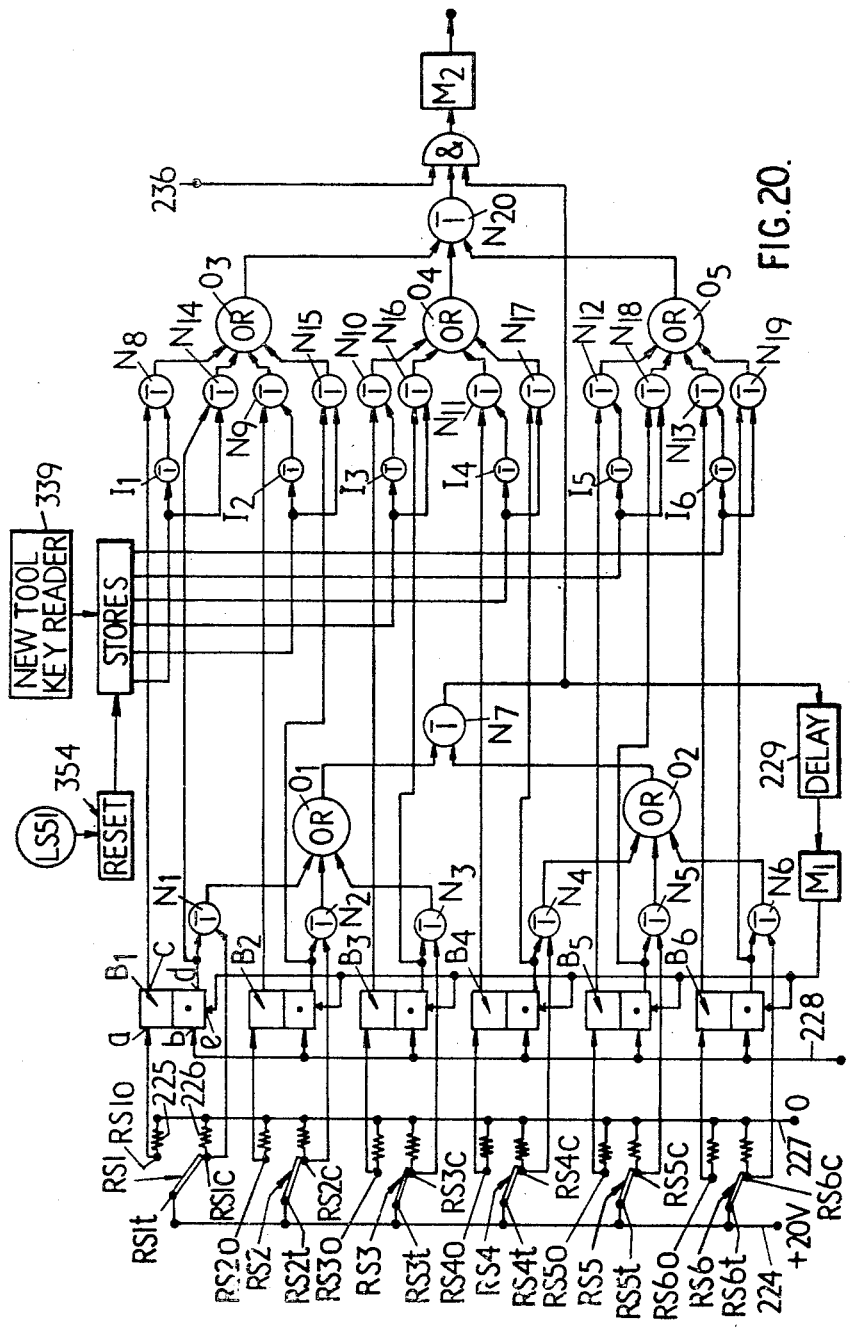

An example of the invention which involves the addition of certain mechanisms to the machine tool described in our U.S. patent application No. 656,845 is illustrated in the accompanying drawings, in which:

FIGURE 1 is a section through the bed of the machine tool, the machine tool being a lathe, looking in a direction away from the headstock thereof, FIGURE 2 is an enlarged elevation looking in the direction opposite that of FIGURE 1, of a drive arrangement for a tool storage magazine included in the arrangement shown in FIGURE 1, FIGURE 3 is a compound section on line 3—3 of FIGURE 2, FIGURE 4 is a section on line 4—4 in FIGURE 2, FIGURE 5 is a section on line 5—5 in FIGURE 2, FIGURE 6 is an elevation corresponding to the bottom left-hand corner of FIGURE 2, but showing a modification which is applied to the drive arrangement for another tool storage magazine in the arrangement shown in FIGURE 1, FIGURE 7 is a section on line 7—7 in FIGURE 6 and corresponds to FIGURE 4, FIGURE 8 is an enlarged fragmentary section on line 8—8 in FIGURE 1, FIGURE 9 is an enlarged fragmentary cross-section on line 9—9 in FIGURE 1, FIGURE 10 is a section on line 10—10 in FIGURE 9, FIGURE 11 is a compound section on line 11—11 in FIGURE 10, FIGURE 12 is an enlarged view of a reading head which co-acts with tool identification devices carried by the tool storage magazines, the view being taken in the same direction as FIGURE 2 and being, in effect, an enlargement of a portion thereof, FIGURE 13 is a view in the direction of the arrow 13 in FIGURE 12, FIGURE 14 is an enlarged fragmentary section on the line 14—14 in FIGURE 1, FIGURE 15 is a section on line 15—15 in FIGURE 14, FIGURE 16 is a view in the direction of arrow A in FIGURE 14, FIGURE 17 is a sectional view on line 17—17 in FIGURE 1, FIGURE 18 is a hydraulic circuit diagram showing the parts of the machine tool relevant to the present invention, FIGURE 19 is a diagram illustrating the sequence of operation of the machine tool in so far as the present invention is concerned, and FIGURE 20 is an electronic logic diagram of the part of the control system involved with the selection of tools from the magazine.

As mentioned above the machine tool described herein is, in effect, a modification of that described in our U.S. patent application No. 656,845. Where parts of the machine tool which have already been described in the said application are mentioned herein the same reference numerals will be applied thereto. The reference numerals for added parts commence at 301.

The lathe includes, in fact, two tool mounting means 39, 47, mounted respectively on cross slides 38, 44 on saddles 35, 41 respectively. The saddles 35, 41 are movable along beds 33, 34 respectively.

A first tool storage magazine 48 is provided to carry tools for placement in the tool mounting means 39, 47. The magazine incorporates a rotary polygonal disc 50 upon which a plurality (in this case thirteen) of projecting tool carriers 51 are mounted.

The disc 50 and the carriers 51 thereon, together with the tool carried thereby, can be driven to and accurately located in any of thirteen equi-angularly spaced positions. For driving the disc 50 there is provided the arrangement shown in FIGURES 2 to 5. The disc 50 is supported on the end of a rotary shaft 133 carried by bearings 134. The shaft 133 is drivingly connected to a hydraulic motor 135 through the intermediary of a gear pair 136, 137 respectively having 78 and 28 teeth and respectively being mounted on the shaft 133 and on a parallel spindle 138. A gear 139 on the spindle 138 has 84 teeth and engages a gear 140 on a further parallel spindle 141. The gear 140 has 18 teeth so that one revolution of the spindle 141 causes one thirteenth of a revolution of the shaft 133. The spindle 141 is connected via further reduction gears 142, 143 to the shaft of motor 135.

The spindle 141 carries a rotary cam 144 with an adjustable screw element 145, the head of which effectively forms the lobe of the cam. This element 145 co-acts with a fixed micro-switch LS3. A dead-stop 146 is carried by a piston 147 slidable in a cylinder 148. This peg can be driven out to the projecting position shown in FIGURE 5 by pressurised oil introduced through a port 149. In this position the end of the peg 146 lies in the path of an abutment 150 on the gear 142. The end of the peg 146 is chamfered as shown in FIGURE 5, and the abutment 150 is likewise provided with a flat to be engaged by the peg 146. To keep the peg properly orientated, a dowel 151 is mounted on a cover 152 which is fitted over the end of the cylinder 148. The dowel is slidably received by a bore in the piston 147. A compression spring 153 provides the necessary force to return the peg 146 to a retracted position when it is required to permit rotation of the gear 142.

The lathe also includes two tool transfer mechanisms 154a and 154b for transferring tools between the magazine 48 and the two tool mounting means 39, 47 respectively. These tool transfer mechanisms and the manner in which these are operated in conjunction with the magazine 48 are fully described in the said U.S. patent application No. 656,845. No further description will be given herein.

FIGURE 9 shows a typical tool, in this particular case a simple form of turning tool, mounted on one of the tool carriers 51. The tool 52 itself is carried at one end of a tool holder shank 53 of substantial cross-sectional dimension. This shank extends, in use, in a direction parallel to the axis of the spindle 31. At the opposite end of the shank the tool holder has an end portion 54 adapted to co-act with the tool mount means and the magazine tool carriers. Such end portion includes a central spigot 55, the free end of which is of slightly tapering form. Slidably mounted on the exterior of the end portion 54 is a cowl 56 which is urged by spring 57 against stops to make an end face 56a of the cowl co-planar with the end face of the spigot 55. The spigot 55 and the cowl 56 are formed with portions 59, 60 of a dovetail groove of arcuate form.

A toothed coupling ring 61 is mounted on the end portion 54 of the tool holder, surrounding the spigot 55 and surrounded by the cowl 56. In the example shown the ring 61 has 12 teeth equi-angularly spaced about the axis of the tool holder. The ring 61 lies in a plane perpendicular to this axis. The teeth on the ring are formed by matching profiled grooves in one face of the ring. The milling cutter used for rough machining has cutting edges parallel to the cutter axis for forming the bases of the grooves and further cutting edges inclined at an included angle of say 40°. The cutter is rotated in a plane radial with respect to the ring axis is fed along a path inclined at an angle of 21° 12 minutes to the plane of the ring. The grooves are finished with a similarly dressed grinding wheel to a depth such that the angular width of each groove measured in a plane slightly below the facial plane of the teeth is precisely 15°. Thus, two of the rings described can be interengaged with their teeth interdigitated by a distance equal to twice the spacing of the 15° width plane from the facial plane. The two rings will be accurately self-aligning by virtue of the inclination of the interengaged flanks of the teeth.

The tool carriers 51 of the magazine 48 are all identical. Each tool carrier 51 has a flat front face 106 on which an arcuate dovetail key 107, complementary to the dovetail grooves in the tool holder ends, is formed. Such keys 107 are of arcuate form of radius corresponding to the radii of the groove, and each has its own centre of curvature situated radially beyond the carrier 51 with respect to the centre of the disc 50. The rear face of each tool carries 51 is of stepped form being flush with the rear face of the disc 50 at the periphery thereof and forming a relatively thin portion 108 at the radially outermost extremity thereof. It is on this thin portion 108 that the dovetail key 107 is formed. Means are provided for locking the tool holders onto the tool carriers 51. Such means comprises a slidable bolt 109 on each carrier 51. This bolt 109 is urged by a spring 110 so that the tapered nose part 111 of the bolt 109 projects from the front face of the tool carrier 51. The nose part 111 enters a recess formed in the tool holder, e.g., the recess 112 shown in the end face of the cowl 56 in FIGURES 9 and 10. The interaction between the tool holder and the bolt 109 prevents the tool holder from being slid along the dovetail key 107.

For withdrawing the bolt 107, each carrier 51 has a pivoted lever 113 housed in a recess 140 in its rear face. One end of this lever fits into a notch in the bolt 109 so that the application of pressure to the other end of the lever 113 will swing the lever and withdraw the nose part 111 of the bolt from the recess 112 (as shown in FIGURE 14).

Each of the tool carriers 51 is also adapted to carry a tool identification device associated with the tool thereon. This device is shown most clearly in FIGURES 12 and 17 and comprises a key 114 having a pair of spaced parallel cylindrical portions 115 interconnected by a flat integral web 116. The opposite areas of the two portions 115 are grooved to define a binary coding for the key. Each cylindrical portion 115 also has, adjacent one end, a tapered notch 117. There are six positions on each cylindrical portion 115 where a tool coding groove may be formed, and there are, of course, many combinations of groove arrangement which can be used. In the present example it is intended to utilise the coding to indicate a decimal number for the tool. Four groove positions indicate the units digit of the number and the other two indicate the tens digit. In the case of the key shown in FIGURE 17 there is a groove at the uppermost possible position but no groove at the next position. The tens digit is therefore represented by the binary number 01 or 1. Similiarly the units digit is represented by 0101 and is therefore 5. The tool number corresponding to the key shown is thus 15. The same arrangement of grooves is present on both cylindrical portions 115.

To receive the key 114, the tool carrier 51 has a slot 118 of keyhole shape, the narrow end of which opens onto the periphery of the carrier 51. This slot receives one of the cylindrical portions 115 and the web 116, leaving the other cylindrical portion 115 projecting beyond the periphery of the carrier 51 behind the thin portion 108 of the carrier 51. An arrangement is provided for locking the individul keys 114 in the slots 118 such arrangement being shown most clearly in FIGURES 12 and 17. As shown, a latch piece 119, with a wedge shaped end 120 adapted to be received by the appropriate one of the notches 117 in the key 114, is slidable in a substantially radial bore 121 in the carrier 51. A latch drive element 122 is slidable in an intersecting bore 123 parallel to the rotary axis of the disc 50. The latch piece 119 and the element 122 has flats on which interengaged inclined tooth formations 124 are formed. These tooth formations are such that movement of the element 122 away from the front face 106 of the carrier 51 (i.e., downwardly as viewed in FIGURE 17) will result in driving of the end 120 of the latch piece 119 into the slot 118 which receives the key 114. The end 120 is received by a notch 117 in a key carried in the slot 118, so as to lock the key firmly in a predetermined position. The wedge-shape of the end 120 ensures that the key does, in fact, take up the desired position within close limits.

Movement of the element 122 in this direction is achieved by means of a spring 125 which acts on a shoulder 126 of the element 122 and on a shoulder 127 within the bore 123. Movement of the element 122 is limited by engagement of the latch piece 119 with the key 114. For occasions when there is no key 114 in the slot 118 however, there is a stop 128 provided on the end of a screw 129 engaged in a hole in the carrier 51, said stop projecting into a milled longitudinally extending groove 130 in the element 132.

The end of the element 122 projects from the rear face of the carrier 51 and is formed with a transverse groove 131. This end of the element 122 is engaged to release the latch piece 119 from engagement with the key 114, by a mechanism (not shown) at each of the two tool transfer positions.

FIGURE 8 shows a device 205 which is employed for accurately locating the magazine disc 50 in any of its thirteen positions. This device 205 comprises a double acting hydraulic piston and cylinder unit 206 mounted on a bracket on the frame carrying the magazine. The piston rod 207 of this unit 206 carries a wedge-shaped plunger 208 which can enter tapered notches 209 in the periphery of the disc 50. A pair of limit switches LS1 and LS2 on the bracket are actuable by the plunger 208 when the latter is respectively withdrawn and advanced.

As shown in FIGURE 1, there is a second tool storage magazine 301. This magazine and its drive unit differ from the magazine 48 and its drive unit in one respect only i.e. as shown in FIGURES 6 and 7. In this case a spindle 302 corresponding to the spindle 141 of the drive arrangement for magazine 48 carries a pair of rotary cams namely a cam 303 corresponding to the cam 144 and an additional cam 304. These cams have their screw elements 305, 306 off-set angularly and there are two switches LS50 and LS51 actuable respectively by the screws 305, 306. The switch LS50 is actuated when the spindle 302 is in a position corresponding to one of the stationary positions of the disc 50 whereas the switch LS51 is actuated by the screw 306 before the switch LS50 in the normal direction of rotation of the spindle 302.

The magazine 301 also has a locating device 307 identical to the locating device 207 of the magazine 48.

An additional tool transfer mechanism 308 is provided for transferring tools between the magazine 48 and the second magazine 301. This device 308 is essentially similar to the mechanism 154a and 154b except that it is considerably simplified since there is no requirement for the keys 114 to be transferred between the mechanism 308 and either of the magazines 48 and 301. As shown in FIGURE 14 the tool transfer mechanism 308 comprises a tool transfer head constituted by a non-rotatable member 309 with a generally circular periphery notched at two diametrically opposite positions to fit behind the carriers 51 of the magazine 48 and the corresponding carriers 310 of the magazine 301. This non-rotatable part 309 is formed with two curved dovetail track portions 310 which can be aligned with the dovetail keys 107 on the carriers 51 and 311 on the carriers 309 to form a substantially continuous circular dovetail track around which the tool holders 53 can be propelled. Secured in the aforementioned notches in the rotatable part 309 are a pair of screws 312 which can co-act respectively with the lever 113 of the carrier 51 and the corresponding lever 330 of the carrier 310.

The rotary part 309 is secured to a flange on a tubular stem 314 to which a piston 315 is secured. This piston slides within a cup-shaped body 316 and the stem 314 passes through a closure 317 at one end of the body 316. Fluid connections 318, 319 are provided in communication with the interior of the body on opposite sides of the piston 315 such that the introduction of pressurized fluid into the body via the connection 318 will cause the piston and the head 308 to be displaced to the operative position shown in FIGURE 14. Introduction of pressurized fluid on the other hand into the other connection 319 will cause the head to be withdrawn to a parking position in which it does not interfere with rotation of either of the magazine discs 50, 301.

Rotatably supported within the tubular stem 314 is a spindle 320 secured to a rotatable part 321 of the head 308. This rotatable part is of generally circular form of diameter less than that of the non-rotatable part 309, and is formed with a pair of oppositely disposed notches 322 to fit closely over the cowls 56 of the tool holders 53. The diameter of the rotatable part 321 is sufficiently small to allow it to rotate without fouling the keys 114. For rotating the spindle 320 there is provided a vane-type rotary hydraulic actuator 323. This actuator has a central hollow rotatable boss 324 which has a splined connection with a splined extension 325 of the spindle 320, the boss 324 being secured to the vane 326 of the actuator. Passages 327, 328 are formed in the casing of the actuator for the admission of hydraulic fluid thereto on opposite sides respectively of the vane 326.

For detecting the position and orientation of the head 308, there are provided four limit switches. Two of these, namely limit switches LS52 and LS53 are mounted on a bracket 329 on the casing of the rotary actuator 323. A rod 330 attached to the spindle extension 325 projects from the rotary actuator and a disc 331 on the end of this rod actuates the switch LS53 when the head 308 is fully withdrawn, and switch LS52 when the head 308 is in its operative position. The other two switches, LS54 and LS55 respectively are also mounted on the casing of the rotary actuator 232 and are operated by a cam element 332 secured to the boss 324. This cam element 323 actuates the switcthes LS54 and LS55 when the actuator is at opposite limits of its travel as defined by a pair of adjustable stops 333 and 334 on the casing co-operating with a finger 335 on the cam element 332.

Turning now to FIGURE 18, the control system for the two magazines and the tool transfer device is shown in some detail. In respect of the magazine 48, a limit switch LS20 is shown in addition to those which are already shown in the mechanical drawings. This limit switch LS20 is operated by a dog on the disc 50 or the spindle 133 thereof to actuate the switch LS20 once on each rotation of the disc 50. A limit switch LS15C is also shown, this switch being positioned so as to be actuated by a bolt 109 of a tool carrier 51 of the magazine 48 when this carrier is situated in position to be operated upon by the tool transfer mechanism 308.

For controlling the magazine drive motor 135 there is provided a three-position solenoid actuated valve V31 with solenoids V31A, which is energised to drive the magazine forwardly, and V31B, which is energised to reverse the motor 135 should this be required. Only solenoid V31A is energised during automatic operation. One port of valve V31 is connected to a medium pressure hydraulic source $P_2$ (at a pressure, for example, of 100 p.s.i.). The other port is connected to a port of a two-position solenoid valve V37 which, when de-energised, connects valve V31 to a two-position solenoid valve V38. When valve V37 is energised it connects valve V31 to drain via a flow restrictor 210 in parallel with a relief valve 211. Valve V38 connects valve V37 directly to drain when de-energised and through a restrictor 212 to drain when energised. The port 149 of the cylinder 148 is connected to the upstream side of the parallel combination of the flow restrictor 210 and the relief valve 211.

For normal forward driving of the magazine, solenoid V31A is energised and solenoids V37 and V38 remain de-energised. For slow running of the magazines, solenoids V31A and V38 are energised. For stopping the magazine (in response to a signal from the switch LS3) valve V37 is energised and valve V31 is de-energised so that a pressure pulse is applied to the cylinder 148. This causes the peg 146 to be ejected. The pressure pulse ends when the magazine disc 50 is at rest so that there is no flow through the restrictor 210. The liquid in the cylinder 148 then leaks away through the restrictor 210 as the spring 153 returns the piston to its initial position.

The device 205 is controlled by a three-position solenoid valve V30 with solenoids V30A and V30B. Energisation of solenoid V30A connects a low pressure source $P_1$ (at a pressure, for example, of 50 p.s.i.) to one end of the unit 205 and connects the other end thereof to drain so that the plunger 208 is driven home. Energisation of the solenoid V30B reverses these connections to withdraw the plunger 208 leaving the magazine disc 50 free to rotate.

The arrangement associated with the second magazine 301 is identical to that described above. Thus, there is a limit switch LS56 actuable by the shaft 336 corresponding to the shaft 133. A dead stop device 337 corresponding to the device 148 is also provided and there are valves V50, V51, V52 and V53 corresponding respectively to the valves V31, V37, V38 and V30 of the magazine 48. The locating device 307 once again, actuates a pair of limit switches to indicate whether the magazine is locked or unlocked, the limit switch LS57 corresponding to limit switch LS1 and limit switch LS58 corresponding to LS2. A further limit switch LS59 senses whether the bolt 338 corresponding to the bolt 109 is withdrawn properly.

The basic principle underlying the operation of the tool changer is as follows. The magazine 301 is indexed in regular steps to bring the tools thereon successively to rest in position for transfer to the magazine 48. As each tool is brought towards its tool change position, the associated key 114 actuates a reading head 339. The coding read off is then stored whilst the magazine disc 50 is rotated until a further reading head 340 senses the corresponding coding on one of the keys 114 on the carriers 51 as these pass the reading head 340. The magazine disc 50 is then stopped with the selected tool thereon presented for transfer to the magazine 301 and the tools are then interchanged, as will hereinafter be explained, without transferring the keys 114.

FIGURES 12 and 13 show the reading head 340 and it will be appreciated that the reading head 339 is identical in all respects. Each head comprises a housing 341 in which there are mounted six identical reading switches RS1 to RS6 arranged in side-by-side relationship. Each such switch is of conventional form comprising a pair of spaced fixed contacts and a spring contact blade urged by its own resilience into engagement with one of the fixed contacts and deformable by an actuating stem 342 into engagement with the other fixed contact. The six actuating stems 342 are engageable respectively by six plungers 343 slidably mounted in bores in one wall of the housing 341. Each plunger 343 is spring loaded to urge it out of engagement with the associated stem 342.

Mounted on a spindle 344 between a pair of lugs 345 on the housing 341 are six spaced cranked levers 346, 347, 348, 349, 350 and 351. One arm of each such lever is straight and these arms extend in spaced parallel relationship projecting from the lugs 345. The edge of each of these arms is shaped to provide a ramp portion 352 and a flat portion 353. The other arm of each of the levers 346 to 351 is cranked, the degree of cranking varying to suit the relative spacing between the groove positions of the key 114 (which spacing determines the spacing of the projecting arms) and the spacing of the plungers 343, which are respectively engaged by the cranked arms of the levers 346 to 351. The reading head 340 is mounted on a bracket on the magazine frame at such a position that the arc between the trailing edge of the flat portion 353 of the straight arm of each lever and the position of a key 114 at the tool change station subtends an angle of 21° at the axis of the corresponding magazine disc. The length of the flat portion is such that it subtends an angle of 2½° at the axis of such disc. The flat portion 353 is tangential to the path of a key 114 when the lever 346 is depressed sufficiently to actuate the corresponding switch RS1. Thus, in use, a lever is depressed by a passing key 114 if there is no groove at the corresponding position on the key 114, for the time taken for the disc to turn through 2½° and is then released.

FIGURE 20 shows the switches RS1 to RS6 connected in the electronic logic circuit they control. In this figure the common terminal RS1$t$ of the switch RS1 is connected to a line 224 held at +20 v. Each of the other terminals RS1$o$ and RS1$c$ being respectively normally open and normally closed are connected via resistors 225, 226 to a line 227 held at 0 v.

There are six bistable circuits $B_1$, $B_2$, $B_3$, $B_4$, $B_5$ and $B_6$, which are controlled respectively by the switches RS1, RS2, RS3, RS4, RS5, and RS6. The circuits $B_1$ to $B_6$ are identical, each having first and second input terminals $a$ and $b$, first and second output terminals $c$ and $d$ and a reset terminal $e$. Each circuit is of well known form such that in one state, to which it can be driven by a pulse at terminal $b$, there is a continuous output from terminal $d$, and in the other state, to which it can be driven by an input at terminal $a$, there is a continuous output from terminal $c$. The circuit can also be driven into said one state by a pulse at terminal $e$. The reference letters $a$, $b$, $c$, $d$ and $e$, have been applied in the drawing only to circuit $B_1$ but the same letters also apply to the corresponding terminals of the other bistable circuits.

The $a$ terminals of the six bistable circuits are connected respectively to the "normally open" terminals RS1$o$ to RS6$o$. The $b$ terminals are all connected to a terminal 228. The "$d$" terminals are connected respectively to input terminals of six NOR gates $N_1$, $N_2$, $N_3$, $N_4$, $N_5$, and $N_6$ which have further input terminals connected respectively to the "normally closed" terminals RS1$c$ to RS6$c$.

The outputs of the NOR gates $N_1$, $N_2$ and $N_3$ are collected by an OR gate $O_1$ and those of gates $N_4$, $N_5$ and $N_6$ by an OR gate $O_2$. The output terminals of the OR gates $O_1$ and $O_2$ are connected to input terminals of a NOR gate $N_7$. The output terminal of the gate $N_7$ is connected to a delay circuit 229 which in turn drives a monostable circuit $M_1$ which has its output terminal connected to the $e$ terminals of all six bistable circuits $B_1$ to $B_6$.

The portion of the circuit so far described operates when the magazine disc 50 is rotating. Provided that there is no input applied at terminal 228, the actuation of any one of switches RS1 to RS6 by a key 114 will result in an input being applied to the $a$ terminal of the associated bistable circuit, thereby setting the latter to produce a continuous output from its $c$ terminal and removing the output from its $d$ terminal. In the case, for example, of the key 114 shown in FIGURE 17, bistable circuits $B_2$, $B_4$, and $B_6$ would be set but circuits $B_1$, $B_3$ and $B_5$ would remain unaltered. As a result NOR gates $N_2$, $N_4$ and $N_6$ would receive no inputs and would therefore produce outputs. NOR gate $N_7$ would therefore produce no output.

After 2½° of movement of the disc 50 is completed the switches RS2, RS4 and RS6, which were actuated by the key 114, will resume their normal conditions. This has no immediate effect on the bistable circuits, but closing of the contacts to terminals RS2$c$, RS4$c$ and RS6$c$ provides inputs for the NOR gates $N_2$, $N_4$ and $N_6$ respectively, so that the outputs from these cease. There will thus be no outputs from OR gates $O_1$ and $O_2$ so that NOR gate $N_7$ will produce an output. There is then a delay, brought about by delay circuit 229, before monostable circuit $M_1$ produces a pulse which resets all the bistable circuits preparatory to the next key 114 reaching the reading head.

It will be seen that there is a short period during which the NOR gate $N_7$ is producing an output and the bistable circuits remain in the states to which they have been set by the influence of the key 114. The switches of the reading head 339 are not shown in detail in FIGURE 20. These switches, as in the case of the switches of the reading head 340 serve to set a series of bistable devices indicated in FIGURE 20 as "stores." These bistable circuits are reset under the influence of a reset circuit 354 actuated by the limit switch LS51. This arrangement operates as follows. As a tool carrier of the magazine 301 approaches the tool change station, limit switch LS51 is first actuated to operate the reset circuit 354 to reset the bistable circuits of the stores to their unset condition. The various switches of the reading head 339 are then actuated to set the stores in accordance with the coding of the new tool approaching the tool change station, where the tool is brought to rest. These bistable circuits continue to produce outputs until the limit switch LS51 is again actuated. The output connections of the six bistable circuits are connected respectively, via inverters $I_1$ to $I_6$ to input terminals of six NOR gates $N_8$ to $N_{13}$. These NOR gates also have input terminals connected to the $c$ terminals of $B_1$ to $B_6$ respectively. The output connections of the bistable circuits are also directly connected respectively to input terminals of six NOR gates $N_{14}$ to $N_{19}$, which have further input terminals connected respectively to the $d$ terminals of circuits $B_1$ to $B_6$. The output terminals of gates $N_8$, $N_9$, $N_{14}$ and $N_{15}$ are connected to an OR gate $O_3$, those of gates $N_{10}$, $N_{11}$, $N_{16}$ and $N_{17}$ to an OR gate $O_4$ and those of gates $N_{12}$, $N_{13}$, $N_{18}$ and $N_{19}$ to an OR gate $O_5$. The outputs of these OR gates are connected to a NOR gate $N_{20}$.

Thus the arrangement is such that if any one of the NOR gates $N_8$ to $N_{19}$ receives no input signals whatever the NOR gate $N_{20}$ will produce no signal. If, on the other hand, each NOR gate $N_8$ to $N_{19}$ receives a signal at one of its input terminals there will be an output from gate $N_{20}$.

In the specific case mentioned above where the tool code of the key 114 read by the reading head 340 is 010101 and the key previously read by the reading head 339 is the same, each gate $N_8$ to $N_{19}$ will receive exactly one input signal—gate $N_8$ receives it signal from inventer $I_1$, gate $N_{14}$ receives its signal from terminal $d$ of circuit $B_1$, gate $N_9$ receives its signal from terminal $c$ of circuit $B_2$, gate $N_{15}$ receives its signal directly from the associated bistable circuit in the stores and so on. Had the key 114 on the magazine 48 being read actually had the code 010111 (i.e. tool No. 17) gate $N_{18}$ would not receive a signal either from the output connection of the bistable circuit corresponding to the fifth digit, or from terminal $d$ of circuit $B_5$ and would therefore have produced an output which would have prevented gate $N_{20}$ from producing an output.

The output terminal of gate $N_{20}$ is connected to one input terminal of an AND gate & which also has an input terminal connected to the output terminal of gate $N_7$ and a further input terminal connected to a terminal 236. Terminals 236 and 228 are both connected to a logic circuit (not shown) which passes an output to terminal 236 whenever a tool selection operation is required, the magazine disc 50 is rotating and there is a signal from at least one of the bistable circuits of the stores. Under any other conditions no signal is applied to terminal 236, but continuous signal is applied to terminal 228 to hold bistable circuits $B_1$ to $B_6$ in their reset conditions.

The AND gate & is followed by a monostable circuit $M_2$.

Thus, under the conditions specified above the keys 114 of the magazine 48 set the appropriate bistable circuits $B_1$ to $B_6$ as they pass the reading head 340. These circuits remain set after the reading switches RS1 to 6 are de-actuated and on the production of an output by gate $N_7$ the AND gate & interrogates gate $N_{20}$. If the coding of the key last read by tool reader 339 does not match the coding read by reader 340 there is no output. After re-setting of the circuits $B_1$ to $B_6$ the next key is read and the cycle is repeated until the correct key is found. Upon interrogation of NOR gate $N_{20}$ a pulse is then produced which initiates stopping of the magazine disc 50.

Returning now to FIGURE 18, there is shown therein a pair of valves V54 and V55, both of which are three-position solenoid actuated valves. The valve V54 has solenoids V54A and V54B connected so that when solenoid V54A is energised pressurised hydraulic fluid is supplied to port 327 and port 328 is connected to drain, and when solenoid V54B is energised these connections are reversed. A further valve V56, which is a two-position solenoid actuated valve, is arranged, on energisation, to short-circuit the valve V54 so that the rotary actuator 323 can be freely turned without difficulty. The valve 355 controls the supply of fluid to the ports 318, 319 of the body 316. Energisation of solenoid V55A causes pressure to be applied to port 318 and energisation of solenoid V55B causes pressure to be applied to port 319.

Referring now to FIGURE 19, the complete sequence of operation is illustrated diagrammatically. At the beginning of a cycle, a signal from the tape reader of the machine is given to the control circuits to exchange all the tools in the magazine 48 for the tools in the magazine 301. Switches LS53 and LS57 are first examined to ensure that the magazine location device 307 is withdrawn and that the head 308 of the tool transfer mechanism is also withdrawn so as not to foul the magazine. The solenoid V50A is then energised to set the magazine 301 in motion. Such motion continues until limit switch LS56 is actuated whereupon the tool change cycle commences. At the next actuation of limit switch LS51, valve V52 is energised to bring the magazine 301 to its slow rotary speed whilst the key 114 approaching the tool change station is read by the reading head 339. On actuation of limit switch LS50 the magazine 301 is brought to a halt with the appropriate tool presented to the tool changing mechanism 308.

At this stage, a logic circuit 300 and 355 receiving the inputs from the stores will energise valve V50A again if the coding sensed by the reading head 339 is 000000, i.e. if there is no key present at that particular position. If the coding is other than 000000 valve V53B is energised to locate the magazine 301 in its position. At this stage valve 31A is energised after an examination of the limit switch LS1 to ensure that the magazine location is disengaged. The magazine 50 is then driven at full speed whilst the reading head 340 senses the keys 114 as these pass. If the key with the same coding as that of the key previously sensed by the reading head 339 is not sensed by the time that the limit switch LS20 has been actuated twice, a warning light is operated to indicate that the tool required is not present in the magazine. The valve V50A is then re-energised to index the magazine 301 through one further step.

If the correct tool is found the circuit shown in FIGURE 20 acts to energise valve V38 to bring the magazine disc 50 down to its slow rotary speed. On actuation of the limit switch LS3 valve V37 is energised and the magazine disc 50 is brought to rest. Valve V30B is then energised to lock the magazine disc 50 in position and the completion of this action is signalled by limit switch LS2.

At this stage valve V55A is energised to drive the tool transfer head 308 from its parking position to its operative position, whereupon limit switch LS52 will be actuated. At the same time, limit switch LS53 will be actuated on withdrawal of the bolts 109 and the corresponding bolt in the magazine 301. A logic circuit 356 now examines the limit switches LS54 and LS55 and causes valve V54A to be energised if switch LS54 is closed and valve V54B to be energised if limit switch LS55 is closed. This causes the rotatable part of the head 308 to be turned through 180° thereby driving the two tools in question around the substantially closed dovetail track referred to above, so as to interchange the positions of the two tools. The completion of this operation is signalled either by limit switch LS55 or by limit switch LS54, valve 55B is then energised to turn the tool transfer head 308 to its parking position.

On actuation of limit switch LS53, valves V53A and V30A are both energised to free both magazines for rotation and the valve V50A is then again energised to turn the magazine 301 through one further step.

This cycle continues until the limit switch LS56 is actuated for a second time indicating that the magazine 301 has made a complete rotation, so that all the tools therein have been exchanged for the corresponding tools in the magazine 48.

It will be appreciated that the invention can be used to advantage in the production machining of small batches of components. During the last machining operation on the last component in a batch a tape command is given for the institution of the exchange cycle for exchanging tools between the magazine 301 and the magazine 48. Such exchange would take place very rapidly, tools having been previously loaded into the magazine 301 at a manual loading station 360 incorporating devices for manually releasing the bolt corresponding to the bolt 109 on a tool carrier at the manual loading station, and for releasing the latch drive element at that station. The tool and its corresponding key can then be simply manually engaged with the tool carrier.

The arrangement can also conveniently be used in the machining of a component which requires more than the fifteen tools which can be carried by the magazine 48 and the two tool mount means 39, 47. In this case the additional tools would be mounted on the magazine 301 at the start of the machining cycle, and, at some convenient stage during the machining cycle, these tools would be interchanged for the corresponding tools of the magazine 48. Machining of the component could then continue without any break and at a later stage of the machining operation the tools could be transferred back to the magazine 301 for commencement of the next cycle.

Having thus described my invention what I claim as new and desire to secure by Letters Patent is:

1. A machine tool comprising at least one tool mounting means, a tool transfer device for exchanging a tool carried by said tool mounting means with a tool selected from a plurality of tools carried by a first indexable tool storage magazine, a second indexable tool storage magazine for holding a plurality of additional tools and means arranged for exchanging a selected tool in the first tool storage magazine for a selected tool in the second tool storage magazine.

2. A machine tool as claimed in claim 1 in which means are provided for indexing the second tool storage magazine in step-by-step fashion for presenting the tools thereon successively to the tool exchanging means for exchange with selected tools from the first tool storage magazine.

3. A machine tool as claimed in claim 2 in which the magazines each have location means for a plurality of tool identification elements associated respectively with the tools in the magazines, there being also provided tool identification means associated with the second magazine arranged to co-act with the tool identification elements of the second magazine, tool identification means associated with the first magazine arranged to co-act with the tool identification elements of the first magazine and control means for the first magazine for stopping the latter with a tool presented to the tool exchanging means with a tool identification element corresponding to the tool identification element of the tool on the second magazine for the time being presented to the tool exchanging means.

4. A machine tool as claimed in claim 3 in which the magazines each have a plurality of tool carriers and the tool exchanging means includes a non-rotatable part positionable relative to the two tool carriers of the magazine, which are presented for the exchange of the tools thereon, to form a substantially continuous circular track around which the tools can be driven, and a rotatable part angularly movable about an axis passing through the centre of said track, said rotatable part being engageable with the tools on said tool carriers to drive the tools around the track.

5. A machine tool as claimed in claim 4 in which said non-rotatable part and said rotatable part form a head which is axially displaceable between a parking position, in which it is clear of the tool carriers of the magazines to permit indexing thereof, and an operative position in which the non-rotatable part forms said track in combination with the tool carriers.

6. A machine tool as claimed in claim 5 in which the tool carriers and the non-rotatable part of the tool exchange means are formed with arcuate dovetail ribs for forming said track, the corresponding tools have arcuate dovetail grooves for interlocking engagement with said ribs.

References Cited
UNITED STATES PATENTS 3,370,346   2/1968   Lehmkuhl _____ 29—568

RICHARD H. EANES, Jr., Primary Examiner